US012314203B2

(12) United States Patent
Seemann et al.

(10) Patent No.: US 12,314,203 B2
(45) Date of Patent: May 27, 2025

(54) CAN CONTROLLER, CAN DEVICE AND METHOD FOR THE CAN CONTROLLER

(71) Applicant: NXP B.V., Eindhoven (NL)

(72) Inventors: Jochen Seemann, Leonberg (DE); Bernd Uwe Gerhard Elend, Hamburg (DE); Matthias Berthold Muth, Stelle (DE)

(73) Assignee: NXP B.V., Eindhoven (NL)

( * ) Notice: Subject to any disclaimer, the term of this patent is extended or adjusted under 35 U.S.C. 154(b) by 48 days.

(21) Appl. No.: 18/484,316

(22) Filed: Oct. 10, 2023

(65) Prior Publication Data

US 2024/0152473 A1    May 9, 2024

(30) Foreign Application Priority Data

Nov. 7, 2022 (EP) .................................... 22205882

(51) Int. Cl.
    *G06F 13/40* (2006.01)
(52) U.S. Cl.
    CPC ...... *G06F 13/4004* (2013.01); *G06F 2213/40* (2013.01)
(58) Field of Classification Search
    CPC .. G06F 13/4027; G06F 13/385; G06F 13/387; G06F 13/42
    USPC ........................................................ 710/315
    See application file for complete search history.

(56) References Cited

U.S. PATENT DOCUMENTS

| 10,095,634 | B2* | 10/2018 | Sharma | G06F 13/4265 |
| 10,129,150 | B2* | 11/2018 | Wu | B60R 16/023 |
| 10,798,222 | B2* | 10/2020 | Kim | H04L 69/08 |
| 11,422,962 | B2* | 8/2022 | Green | G06F 13/38 |
| 2008/0005431 | A1* | 1/2008 | Juppo | H04L 12/4135 710/106 |
| 2018/0234498 | A1 | 8/2018 | Sangameswaran et al. | |
| 2020/0220888 | A1* | 7/2020 | Terazawa | B60T 17/221 |

(Continued)

FOREIGN PATENT DOCUMENTS

| CN | 106059806 A | 10/2016 |
| CN | 109167737 B | 5/2022 |
| WO | WO-2005119974 A1 | 12/2005 |

OTHER PUBLICATIONS

"Gateway Strategies for Embedding of Automotive CAN-Frames into Ethernet-Packets and Vice Versa"—Andreas Kern, Dominik Reinhard, Thilo Streichert, and Jurgen Teich; 12 pages, Dated Feb. 2011 (Year: 2011).*

*Primary Examiner* — Brian T Misiura

(57) ABSTRACT

The present disclosure relates to a Controller Area Network, CAN, controller, comprising: an input interface, a transmit data, TXD, interface, and a processing unit, wherein the processing unit is configured to receive via the input interface a data packet comprising a packet priority field, a packet payload field, the processing unit is configured to generate a first CAN frame based on the data packet, such that a first payload field of the first CAN frame represents at least the packet payload field and a first identifier field of the first CAN frame includes, a first identifier part representing predefined data for identifying the CAN controller and a second identifier part representing the packet priority field and/or includes a queue field representing a queue priority for the first CAN frame, and the processing unit is configured to send the first CAN frame via the TXD interface.

18 Claims, 6 Drawing Sheets

(56) References Cited

U.S. PATENT DOCUMENTS

2022/0070020 A1    3/2022  Mutter et al.
2023/0353417 A1*   11/2023 van Dijk ........... H04L 12/40032

* cited by examiner

CAN CONTROLLER, CAN DEVICE AND METHOD FOR THE CAN CONTROLLER

CROSS-REFERENCE TO RELATED APPLICATIONS

This application claims priority under 35 U.S.C. § 119 to European patent application no. 22205882.8, filed Nov. 7, 2022, the contents of which are incorporated by reference herein.

TECHNICAL FIELD

The present disclosure relates to Controller Area Network, CAN, Controller, a CAN device comprising the CAN controller, and a method for the CAN controller

BACKGROUND

CAN buses can be used for communications within vehicles, in particular within automobiles. It will be appreciated that CAN buses also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, minor adjustment, battery and recharging systems for hybrid/electric cars, and many more. A CAN protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new (optional) level scheme on the physical layer allowing even higher data rates is in the definition phase discussed under CiA610 (CAN in Automation) and is moving towards standardization in the form of either a further update of the existing ISO11898 standards or a new standard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

In accordance with a first aspect of the present disclosure, a Controller Area Network, CAN, controller is provided. The CAN Controller comprising: an input interface, a transmit data, TXD, interface, and a processing unit, wherein the input interface is coupled to the processing unit, wherein the processing unit is configured to receive via the input interface a data packet comprising a packet priority field, a packet payload field, wherein the processing unit is configured to generate a first CAN frame based on the data packet, such that a first payload field of the first CAN frame represents at least the packet payload field and a first identifier field of the first CAN frame comprises a first identifier part and a second identifier part, wherein the first identifier part represents predefined data for identifying the CAN controller, and wherein the second identifier part represents the packet priority field and/or comprises a queue field representing a queue priority for the first CAN frame, wherein the processing unit is coupled to the TXD interface, and wherein the processing unit is configured to send the first CAN frame via the TXD interface.

In one or more embodiments, the first identifier part forms the least significant bits of the first identifier field of the first CAN frame.

In one or more embodiments, the processing unit is configured to generate the first CAN frame based on the data packet such that the first identifier field of the first CAN frame is formed by the first identifier part, the second identifier part and a further, third identifier part.

In one or more embodiments, the third identifier part forms the most significant bit of the first identifier field of the first CAN frame.

In one or more embodiments, the first identifier field of the first CAN frame is formed in the following order of associated parts: third identifier part, second identifier part, and first identifier part.

In one or more embodiments, the second identifier part is formed by the queue field, and wherein the third identifier part represents or is formed by the packet priority field.

In one or more embodiments, the second identifier part represents or is formed by the packet priority field, and wherein the third identifier part is formed by the queue field.

In one or more embodiments, the CAN controller is configured to store the first CAN frame.

In one or more embodiments, each of the second and third identifier part represents a sub-priority of the first CAN frame by at least two bits and at most ten bits.

In one or more embodiments, the CAN controller comprises a receive-data, RXD, interface, wherein the processing unit is coupled to the RXD interface, and wherein the processing unit is configured to perform the following steps:
S4) receiving via the RXD interface an RXD signal representing at least a part of a second CAN frame caused by sending the first CAN frame;
S5) detecting based on the RXD signal whether a complete sending of the first CAN frame was either successful or unsuccessful;
S6) if the sending of the first CAN frame was unsuccessful, modifying the first identifier field of the first CAN frame such that the second and/or third identifier part causes a higher priority of the first CAN frame; and
S7) sending the modified first CAN frame via the TXD interface.

In one or more embodiments, the processing unit is configured to repeatedly perform the group comprising steps S4) to S7) until the successful sending of the first CAN frame is detected in step S6).

In one or more embodiments, the processing unit is configured to incrementally increase the sub-priority represented by the second or third identifier part with each performing of step S6).

In one or more embodiments, the processing unit is configured to detect in step S6) a respective time since the first unsuccessful attempt to send the first CAN frame, referred to as a waiting time, and to increase the sub-priority represented by the second or third identifier part based on the waiting time.

According to a second aspect of the present disclosure, a CAN device is provided. The CAN device comprising a CAN transceiver and a CAN controller according to the first aspect and/or any of the previous embodiments thereof.

According to a third aspect of the present disclosure, a method for a or the CAN controller is provided. The CAN controller comprising an input interface, a transmit data, TXD, interface, and a processing unit, wherein the input interface is coupled to the processing unit, wherein the processing unit is coupled to the TXD interface, and wherein the method comprising the steps of:

S1) Receiving a data packet at the processing unit via the input interface, the data packet comprising a packet priority field, a packet payload field;

S2) Generating a first CAN frame based on the data packet at the processing unit, such that a first payload field of the first CAN frame represents at least the packet payload field and a first identifier field of the first CAN frame comprises a first identifier part and a second identifier part, wherein the first identifier part represents predefined data for identifying the CAN controller, and wherein the second identifier part represents the packet priority field and/or comprises a queue field representing a queue priority for the first CAN frame; and S3) Sending the first CAN frame via the TXD interface.

In accordance with a fourth aspect of the present disclosure, a computer program is provided, comprising executable instructions which, when executed by a processing unit, cause the processing unit being configured to carry out the method of the third aspect and/or one or more embodiments thereof.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DESCRIPTION OF EMBODIMENTS

Figure 1:
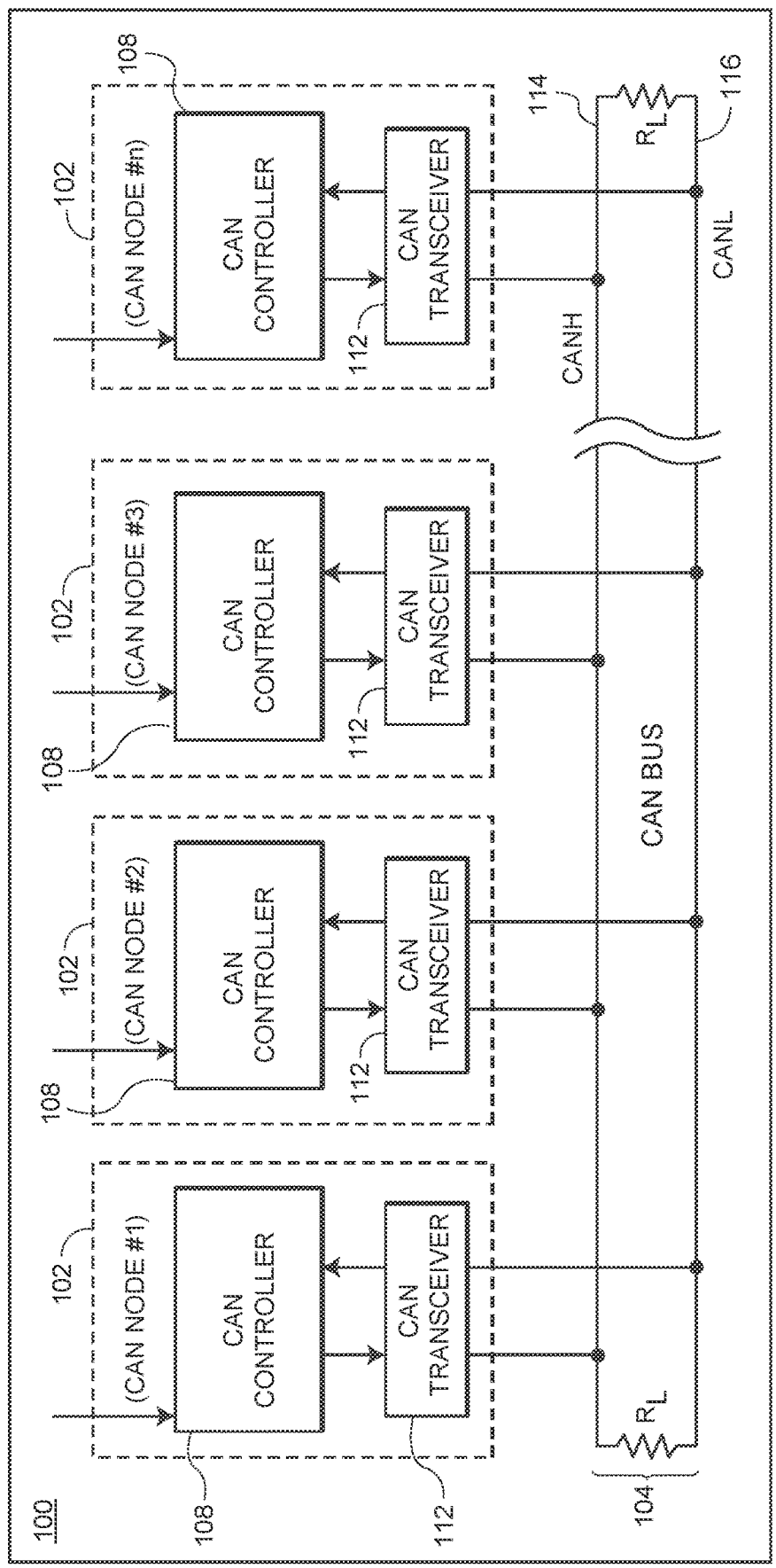
FIG. 1 shows a simplified block diagram of a CAN System.

FIG. 1 schematically depicts an example of a CAN system 100 that is known in the field. The CAN system may include multiple CAN devices 102, also referred to as CAN nodes 102 or "ECUs" 102, each connected to a CAN BUS network 104. In the embodiment of FIG. 1, each CAN device 102 includes a CAN protocol controller 108 and a CAN transceiver 112. The CAN protocol controller 108 may be embedded in a microcontroller (not shown) of the CAN device 102. The CAN protocol controller 108 may be referred to as a CAN controller 108. The CAN transceiver 112 may be referred to as a transceiver 112.

The CAN controllers 108 are typically connected directly or indirectly to at least one device outside the system 100, such as a switch, a main controller, an actuator, or some other control device. The CAN controllers 108 are often programmed to determine the meaning of received messages and to generate appropriate outgoing messages. A processing unit 204 of a CAN controller 108 may also be referred to as host processors, hosts or digital signal processors (DSPs). In an embodiment, the processing unit of the CAN controller supports application software that interacts with the interfaces 200, 202, 230 of the CAN controller 108.

The CAN BUS network 104 carries analog differential signals and includes a first CAN signal line 114, which is also referred to as the CAN high (CANH) bus line 114, and a second CAN signal line 116, which is also referred to as the CAN low (CANL) bus line 116. The CAN BUS network 104 is known in the field.

Figure 2:
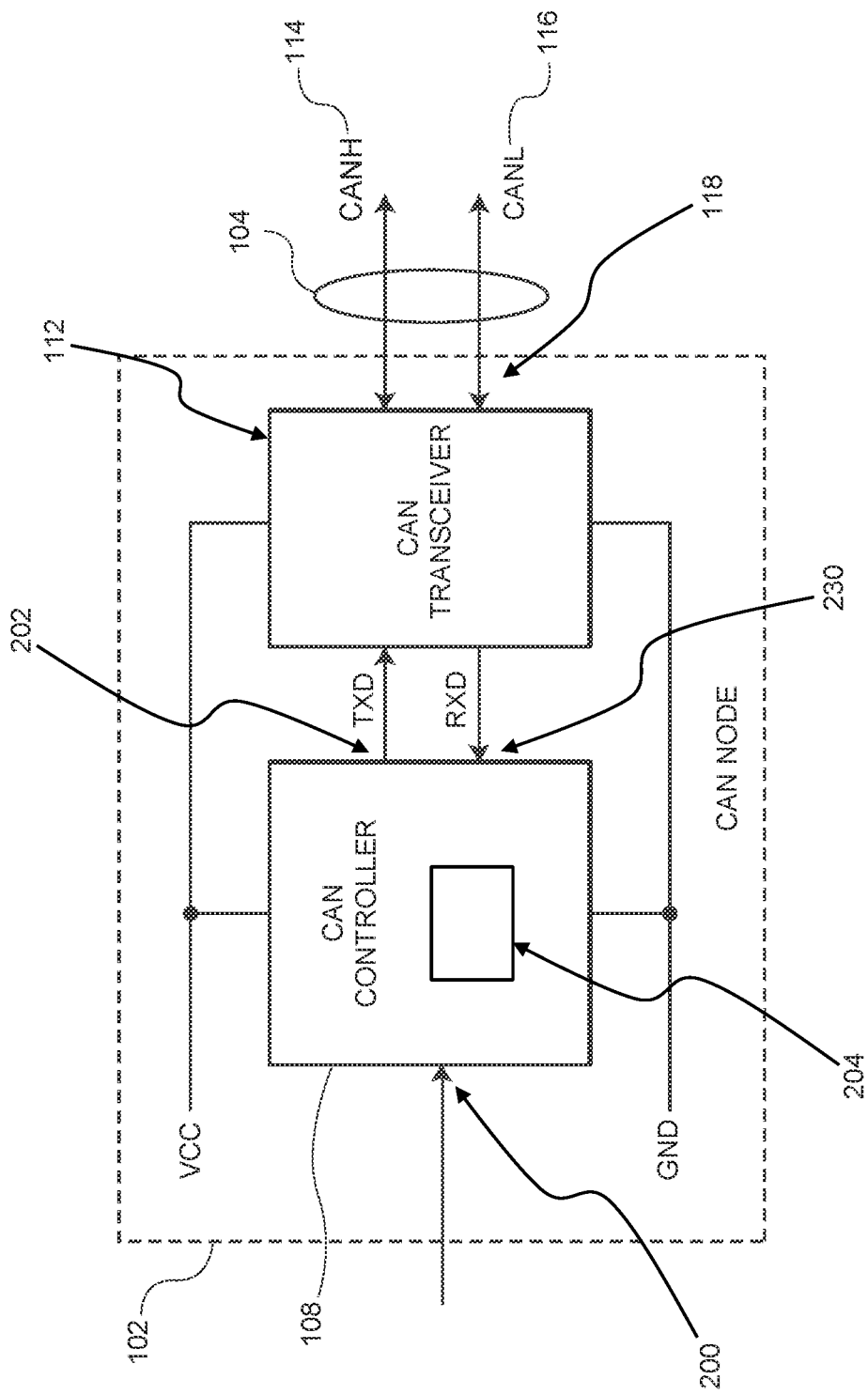
FIG. 2 shows a simplified block diagram of a CAN Device.

FIG. 2 depicts an expanded view of one CAN device 102 from FIG. 1. In the expanded view of FIG. 2, the CAN controller 108 comprises a processing unit 204, which may, for example, run a software application that is stored in a memory of the CAN controller 108 and executed by processing circuits of the CAN controller 108. The CAN controller 108 and the CAN transceiver 112 of the CAN device 102 are connected between a first supply voltage, VCC, and as second supply voltage, which is usually ground, GND. As illustrated in FIG. 2, data communicated from CAN controller 108 to the CAN transceiver 112 is identified as transmit data (TXD) and data communicated from the CAN transceiver 112 to the CAN protocol controller 108 is referred to as receive data (RXD). Throughout the description, TXD is carried on a TXD path and RXD is carried on an RXD path. The CAN transceiver comprises a BUS interface to communicate messages to and from the CAN BUS network 104 via the CANH and CANL bus lines 114 and 116, respectively.

The data link layer operations between the CAN protocol controller 108 and the CAN transceiver 112 is known in the field. For example, in receive operations, the CAN controller 108 receives from the transceiver 112 a digital RXD signal via the RXD path. The RXD signal may represent an CAN message. The CAN controller 108 may store the received CAN message. The CAN message complies with the frame format of the CAN protocol, in particular with the CAN FD format and/or the CAN XL format. In transmit operations, the CAN controller 108 transmits a TXD signal, which also represents a CAN message, via the TXD path to the CAN transceiver 112. The CAN message typically complies with the frame format of the CAN protocol, in particular with the CAN FD format and/or the CAN XL format.

The CAN transceiver 112 is located between the CAN controller 108 and the CAN BUS network 104. The CAN transceiver 112 is configured to implement physical layer operations according to the CAN protocol as known in the field.

For example, in receive operations, a CAN transceiver 112 converts analog differential signals from the CAN BUS network 104 to the RXD signal that the CAN controller 108 can interpret. The CAN transceiver 112 may also protects the CAN controller 108 from extreme electrical conditions on the CAN BUS network 104, e.g., electrical surges.

In transmit operations, the CAN transceiver 112 can convert the TXD signal received via the TXD path from the CAN controller 108 into analog differential signals that are sent over a CAN BUS interface 118 on the CAN BUS network 104. The CAN BUS interface 118 is adapted to be connected to the first and second CAN BUS signal lines 114, 116.

As noted above, the CAN controller 108 can be configured to support CAN FD and/or CAN XL.

Figure 3:
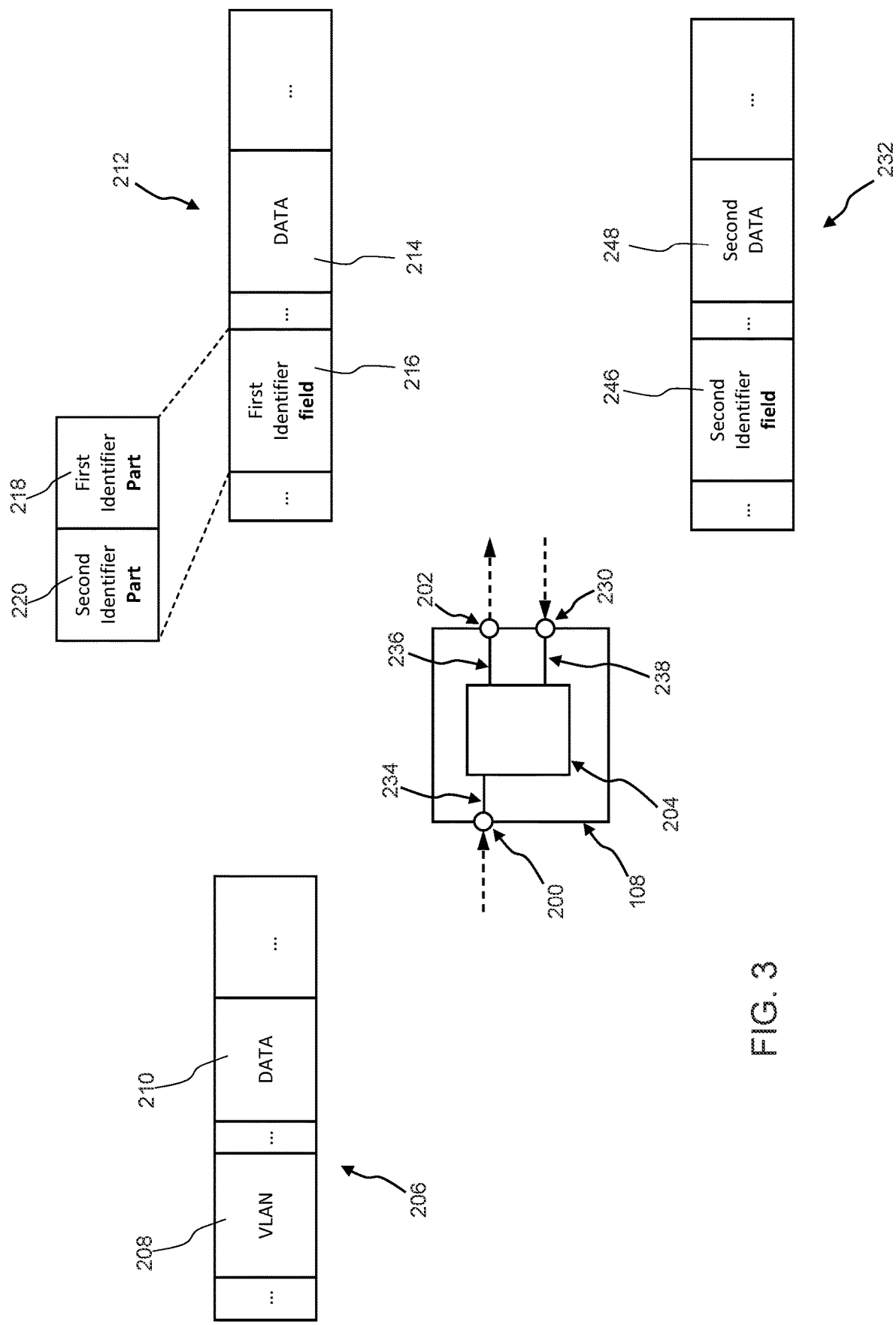
FIG. 3 shows a simplified block diagram of a CAN Controller and simplified representations of a data packet and CAN frames.

In the center of FIG. 3, an example of a CAN controller 108 is shown schematically. The CAN controller 108 comprises an input interface 200, a transmit data interface (TXD interface) 202, and preferably a receive data interface (RXD interface) 230. In addition, the CAN controller 108 comprises a processing unit 204. The input interface 200 is coupled to the processing unit 204. In an example, a signal connection 234 may extend from the input interface 200 to the processing unit 204.

The processing unit 204 is configured to receive at least one data packet 206 via the input interface 200. FIG. 3 schematically illustrates an example of a data packet 206. The data packet 206 includes a packet priority field 208 and a packet payload field 210. In an example, the data packet 206 is formed by an Ethernet packet 206. The Ethernet packet 206 is preferably a data packet according to standard IEEE 802.3 and/or according to standard IEEE 802.1Q. The Ethernet packet 206 may comprise the following fields:

| | |
|---|---|
| Receiver MAC address | The receiver MAC address (RCV MAC) preferably represents and/or identifies the target device, in particular a target network station, which is to receive the data packet. The receiver MAC address preferably has 48 bits. |
| Transmitter MAC address | The transmitter MAC address (SND MAC) preferably represents and/or identifies the transmitter device, in particular a transmitter network station, that sends the data packet. The transmitter MAC address preferably has 48 bits. |
| VLAN tag | A Virtual Local Area Network (VLAN) is a logical subnet in a physical network. The VLAN tag has a total length of 32 bits. The VLAN tag preferably consists of the following four associated fields: Tag Protocol Identifier (TPI), Priority Code Point (PCP), Drop Eligible Indicator (DEI), and VLAN Identifier (VID). The PCP field represents a priority of the data packet. The priority of the data packet 206 represented by the PCP field may help and/or ensure to achieve low latency or high data security of heavily loaded networks. The other fields are known from the standard. |
| Type field | The type field (TYP) provides information about the used protocol of the next higher layer. |
| User data | The user data field (DATA) preferably comprises a maximum of 1500 bytes. The user data are interpreted by the protocol specified under Type. |

Figure 4:
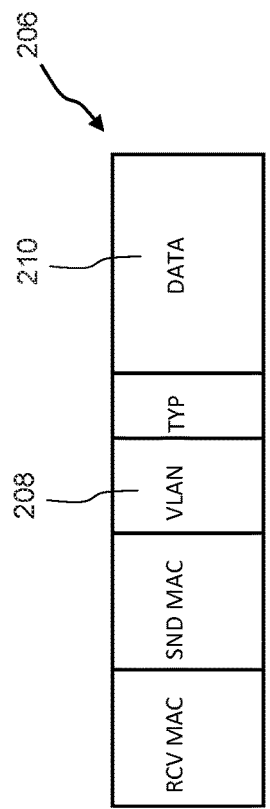
FIG. 4 shows a simplified representation of a data packet.

Provided that the data packet 206 is formed by an Ethernet packet 206, as schematically shown for example in FIG. 4, the packet priority field 208 is preferably formed by the PCP field of the Ethernet packet 206 and the packet payload field 210 is formed by the payload data of the Ethernet packet 206.

To the extent that the data packet 206 is formed by a data packet that is not formed in accordance with the Ethernet standard, the data packet 206 may still include a packet priority field 208 representing the priority of the data packet 206 and a packet payload data field 210 comprising the payload data of the data packet 206.

The processing unit 204 of the CAN controller 108 is configured to generate a first CAN frame 212 based on the data packet 206. Preferably, the first CAN frame 212 is generated by the CAN controller 108 such that the first CAN frame 212 is formed according to the CAN FD standard or the CAN XL standard. Furthermore, the first CAN frame 212 is generated by the CAN controller 108 such that the first CAN frame 212 comprises a payload field, referred to as the first payload field 214, and an identifier field, referred to as the first identifier field 216. Preferably, the first CAN frame 212 comprises further fields.

Figure 5:
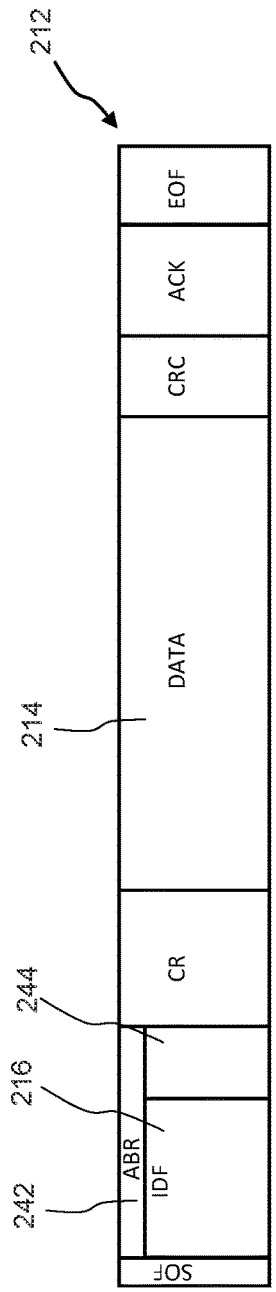
FIGS. 5 and 6 show representations of CAN frames.

In FIG. 5, an example of a CAN frame is shown schematically. The first CAN frame 212 may also have the structural design as shown for the CAN frame in FIG. 5. The following explanations for the first CAN frame 212 may apply in an analogous manner to the general structure of a CAN frame.

The first CAN frame 212 preferably has the following fields:

| | |
|---|---|
| SOF | Start of Frame (SOF) |

Arbitration Arbitration (ABR) Field, which includes the Identifier (IDF) Field.

| | |
|---|---|
| CR | Control (CR) Filed |
| Data | Payload Data Field |
| CRC | Cyclic Redundancy Check (CRC) |

-continued

| | |
|---|---|
| ACK | Acknowledge (ACK) |
| EOF | End of Frame (EOF) |

The meaning of the previously mentioned fields can be taken from the standard for CAN FD and/or CAN XL.

The arbitration field 242 of the first CAN frame 212 preferably comprises the identifier field 216 and optionally a further field 244. The further field may comprise multiple bits, and preferably further sub-fields. Further, the first CAN frame 212 comprises a data field 214. In an example, the bit length of the data field 214 of the first CAN frame 212 can be longer than the total bit length of the data packet 206.

If a data packet 206 is received via the input interface 200 of the CAN controller 108, it is possible that the entire data packet 206 is received and/or embedded in the data field 214 of the first CAN frame 212, so that the entire data packet 206 is sent to a further CAN device 102 via the CAN BUS network 104 by means of the first CAN frame 212. In this further CAN device 102, the entire data packet 206 may again be extracted from the first CAN frame 212 in order to send the data packet 206, for example, via an Ethernet interface or connection.

However, in an example, it is also possible that only selected fields of the data packet 206 are transmitted by means of the first CAN frame 212. Therefore, it is provided that the first payload data field 214 of the first CAN frame 212 comprises and/or represents at least the packet payload data field 210 of the data packet 206. The bits of the packet payload data field 210 may be included as a copy of the payload data field 214 of the first CAN frame 212. In addition, the payload data field 214 of the first CAN frame 212 may comprise and/or represent other fields of the data packet 206.

The data packet 206 includes the packet priority field 208 that represents the priority of the data packet 206. In an example, the data packet 206 is formed by an Ethernet packet 206, such that packet's VLAN tag 208 includes the PCP field that represents the priority of the Ethernet packet 206. Using the PCP field, it is possible for a sender in an Ethernet network to send multiple data packets 206 with different priorities, each represented by the associated PCP field. If the data packets 206 are each forwarded via an associated, first CAN frame 212, it is desirable that the priority of each first CAN frame 212 is at least partially determined or influenced by the priority of the respective transported data packet 206.

Figure 6:
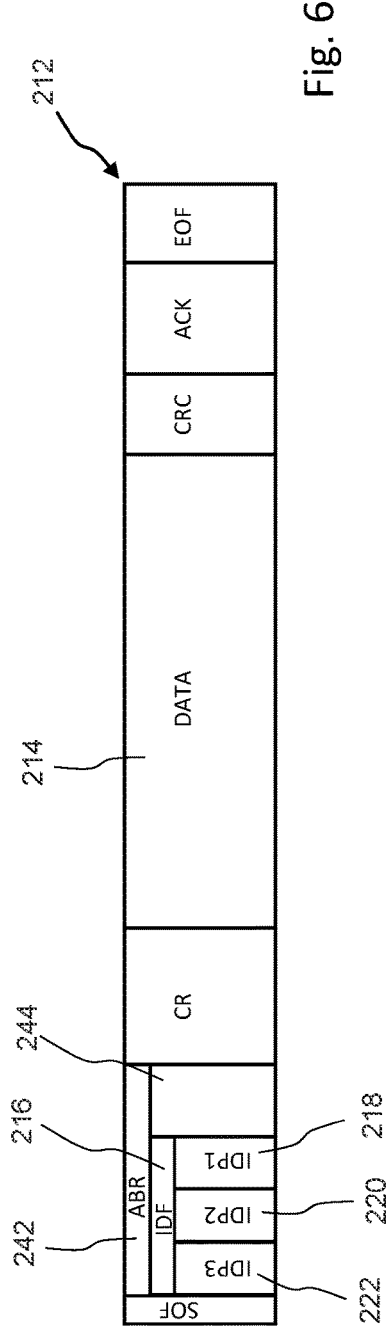

In order to at least partially integrate the priority of the respective data packet 206 into the priority of the first CAN frame 212, it is provided that the processing unit 204 of the CAN controller 108 is configured to generate the first CAN frame 212 based on the data packet 206 such that a first identifier field 216 of the first CAN frame 212 comprises at least two parts, namely at least a first identifier part 218 and a second identifier part 220. FIG. 6 schematically illustrates an example of the first CAN frame 212, wherein the first identifier field 216 of the first CAN frame 212 is divided into a plurality of parts 218, 220, 222. Therefore, the first identifier field 216 of the first CAN frame 212 may comprise at least the first identifier part 218 and the second identifier part 220.

The first identifier part 218 represents predefined data for identifying the CAN controller 108. In a CAN system 100, such as schematically shown in FIG. 1, a plurality of CAN devices 102 are coupled to the CAN bus 104. Each CAN device 102 has an associated CAN controller 108. For each of the CAN controllers 108, predefined data may be provided to uniquely identify the respective CAN controller 108. The predefined data for the plurality of CAN controllers 108 differ from one another. The CAN controllers 108 may therefore be configured to generate different first identifier parts 218.

Each CAN controller 108 may be configured to generate a first CAN frame 212 having an associated first identifier field 216 that includes an associated first identifier part 218. The first identifier field 216 of a first CAN frame 212 may represent the priority of the respective CAN frame 212, such that an associated first identifier part 218 of the respective first identifier field 216 may define a sub-priority of the overall priority of the respective first CAN frame 212. This sub-priority may be determined by the predefined data identifying the CAN controller 108. Depending on the CAN controller 108 generating the first CAN frame 212, the aforementioned sub-priority of the first CAN frame 212 may therefore be higher or lower. As a result, and as according to the CAN standard, the CAN controller 108 may therefore at least partially influence which (sub-) priority a first CAN frame 212 generated by the CAN controller 108 receives.

In an example, the overall priority of the first CAN frame 212 is represented by the first identifier field 216. The first identifier field 216 may form the identifier or IDF field according to the CAN standard. According to the present disclosure, however, the overall priority of the first CAN frame 212 is not determined solely by the aforementioned sub-priority, because the first identifier field 216 of the first CAN frame 212 also has at least the second identifier part 220. The overall priority may be formed from the associated sub-priorities. Therefore, the sub-priority represented by the second identifier part 220 preferably forms a part of the overall priority of the first CAN frame 212.

The second identifier part 220 of the first identifier field 216 of the first CAN frame 212 represents the packet priority field 208 of the data packet 206 and/or comprises a queue field. The queue field preferably represents a queue priority for the first CAN frame 212.

In an example, the second identifier part 220 of the first identifier field 216 represents the priority field 208 of the data packet 206. In this example, it is further possible that the second identifier part 220 does not include and/or represent a queue field. The data packet 206 may be formed by an Ethernet packet 206, such that the packet priority field 208 may be formed by the PCP field of the Ethernet packet 206. The PCP field represents the priority of the Ethernet packet 206, and to anchor the priority of the data packet 206 in the overall priority of the first CAN frame 212, the priority of the Ethernet packet 206 may also be represented by the second identifier part 220 in said example. The priority of the Ethernet packet 206 may cause and/or form another sub-priority of the overall priority of the first CAN frame 212. If the Ethernet packet 206 has a high priority, the consequence is that the overall priority of the first CAN frame 212, in whose first payload data field 214 at least the packet payload data field 210 of the Ethernet packet 206 is represented, is also increased. If, on the other hand, the Ethernet packet 206 has a low priority, the overall priority of the first CAN frame 212, in whose first user data field 214 at least the packet user data field 210 of the Ethernet packet 206 is represented, will also be lower. Therefore, the priority of the Ethernet packet 206 may to some extent affect the overall priority of the first CAN frame 212.

In a CAN system 100, as schematically illustrated in an example shown in FIG. 1, a plurality of CAN controllers 108 may each generate a first CAN frame 212 based on a previously received data packet 206. In this regard, it may further be the case that the packet priority fields 208, in particular PCP fields of the data packets 206, represent different priorities. In order to send a data packet 206, whose packet priority field 208 directly or indirectly represents a higher priority, as a data packet 206 embedded in the first CAN frame 212 with a higher priority over the CAN bus 104, it had been found advantageous if the priority represented by the packet priority field 208 at least partially influences the priority of the first CAN frame 212. This influencing may be carried out as previously explained. As a result, data packets 206 having a higher priority may also be sent via the first CAN frame 212 over the CAN bus 104 with a higher priority.

In another example, the second identifier part 220 includes a queue field representing a queue priority for the first CAN frame 212. If a CAN device 102 comprising a CAN controller 108 and a CAN transceiver 112 attempts to send a first CAN frame 212 over the CAN bus 104, it is possible that with each lost arbitration, the queue priority for the first CAN frame 212 is increased. The increased queue priority also increases the overall priority of the first CAN frame 212. If the CAN device 102 attempts to send the first CAN frame 212 over the CAN bus 104 again, there is a better chance due to the increased overall priority that the first CAN frame 212 will win in the arbitration so that the first CAN frame 212 can be sent over the CAN bus 104. On the other hand, if the arbitration is lost, the previously explained increase in queue priority and another attempt to send the first CAN frame 212 may be performed. As a result, the overall priority of a first CAN frame 212 whose first payload field 214 represents at least the packet payload field 210 may be increased with each lost arbitration, providing a dynamic improvement in priority when sending data packets 206 over first CAN frames 212.

Previously, two examples of the second identifier part 220 were explained, and each of the two examples may be provided exclusively or in combination for the second identifier part 220.

The processing unit 204 of the CAN controller 108 is coupled to the TXD interface 202. In an example, a signal connection 236 may extend from the processing unit 204 to the TXD interface 202.

The processing unit 204 is further configured to send the first CAN frame 212 over the TXD interface 202. In an example, the processing unit 204 may send the first CAN frame 212 to a CAN transceiver 112 via the TXD interface 202. FIG. 2 schematically illustrates an example of a CAN device 102 comprising a CAN controller 108 and a CAN transceiver 112. In the CAN device 102, it may be provided that a signal connection extends from the TXD interface 202 to the CAN transceiver 112 so that the first CAN frame 212 may be transmitted from the CAN controller 108 to the CAN transceiver 112. Based on the first CAN frame 212, the CAN transceiver 112 may generate a CAN bus signal at the CAN BUS interface 118, the CAN bus signal representing the first CAN frame 212.

In the upper right quadrant of FIG. 3, an example of the first CAN frame 212 is schematically shown. The first CAN frame 212 may have the structure shown schematically in FIG. 6. In FIG. 3, the first CAN frame 212 is shown in simplified form. The first CAN frame 212 includes the first identifier field 216, the first payload field 214, and other fields. The first identifier field 216 may have at least two parts (sub-fields), namely the first identifier part 218 and the second identifier part 220.

The second identifier part 220 may have a higher impact on the overall priority than the first identifier part 218. In other words, the second sub-priority represented by the second identifier part 220 has a greater impact on the overall priority of the first CAN frame 212 than the first sub-priority represented by the first identifier part 218. The first identifier part 218 may be formed by predefined data identifying the CAN controller 108. This predefined data may thus represent the first sub-priority, which has a lesser influence on the overall priority of the first CAN frame 212. The second sub-priority has a greater influence on the overall priority. The second sub-priority is represented by the second identifier part 220, which in an example is formed by the packet priority field 208 of the data packet 206. In this example, the packet priority field 208 may represent the second sub-priority via the second identifier part 220, which has a greater impact on the overall priority of the first CAN frame 212. The higher the priority of the data packet 206, the higher the overall priority of the first CAN frame 212 will be and the higher the chance that the first identifier field 216 will result in a win in an arbitration.

In an example, the bits of the first identifier part 218 form the least significant bits of the first identifier field 216 of the first CAN frame 212. In other words, the first identifier part 218 may include the least significant bits of the first identifier field 216 of the first CAN frame 212. The first identifier part 218 may therefore form the least significant bit of the first identifier field 216 of the first CAN frame 212. Therefore, the first sub-priority represented by the first identifier part 218 has the least influence on the overall priority of the first CAN frame 212 in the aforementioned two examples, where the overall priority of the first CAN frame 212 is represented by the first identifier field 116. Nevertheless, the first sub-priority is not completely insignificant. In another example, if two CAN controllers 108 each receive the identical data packet 206, and it is assumed that different predefined data is provided for each of the two CAN controllers 108 to identify the respective CAN controller 108, a first CAN frame 212 may be generated by each of the two CAN controllers 108 based on the respective received data packet 206. Each of the two CAN frames 212 includes a first identifier field 216. The two first identifier fields 216 may each have a first identifier part 218 and a second identifier part 220. The two second identifier parts 220 may also be identical based on the identity of the data packets 206. However, the two first identifier parts 218 differ because the data identifying the two CAN controllers 108 also differ. It follows that the overall priorities of the two first CAN frames 212 also differ. In the above example, the difference is determined by the two CAN controllers 108 or by the predefined data for identifying the two CAN controllers 108. One of the two CAN controllers 108 therefore will therefor win the arbitration over the other one when (trying) transmitting the first CAN frames 212.

In an example, the processing unit 204 of the CAN controller 108 is configured to generate the first CAN frame 212 based on the data packet 206 such that the first identifier field 216 of the first CAN frame 212 is formed by the first identifier part 218, the second identifier part 220, and another third identifier part 222. Each identifier part 218, 220, 222 of the first identifier field 216 may be understood as a sub-field of the identifier field 216. Preferably, the identifier field 216 is formed exclusively by the aforementioned three identifier parts 218, 220, 222.

Figure 7:
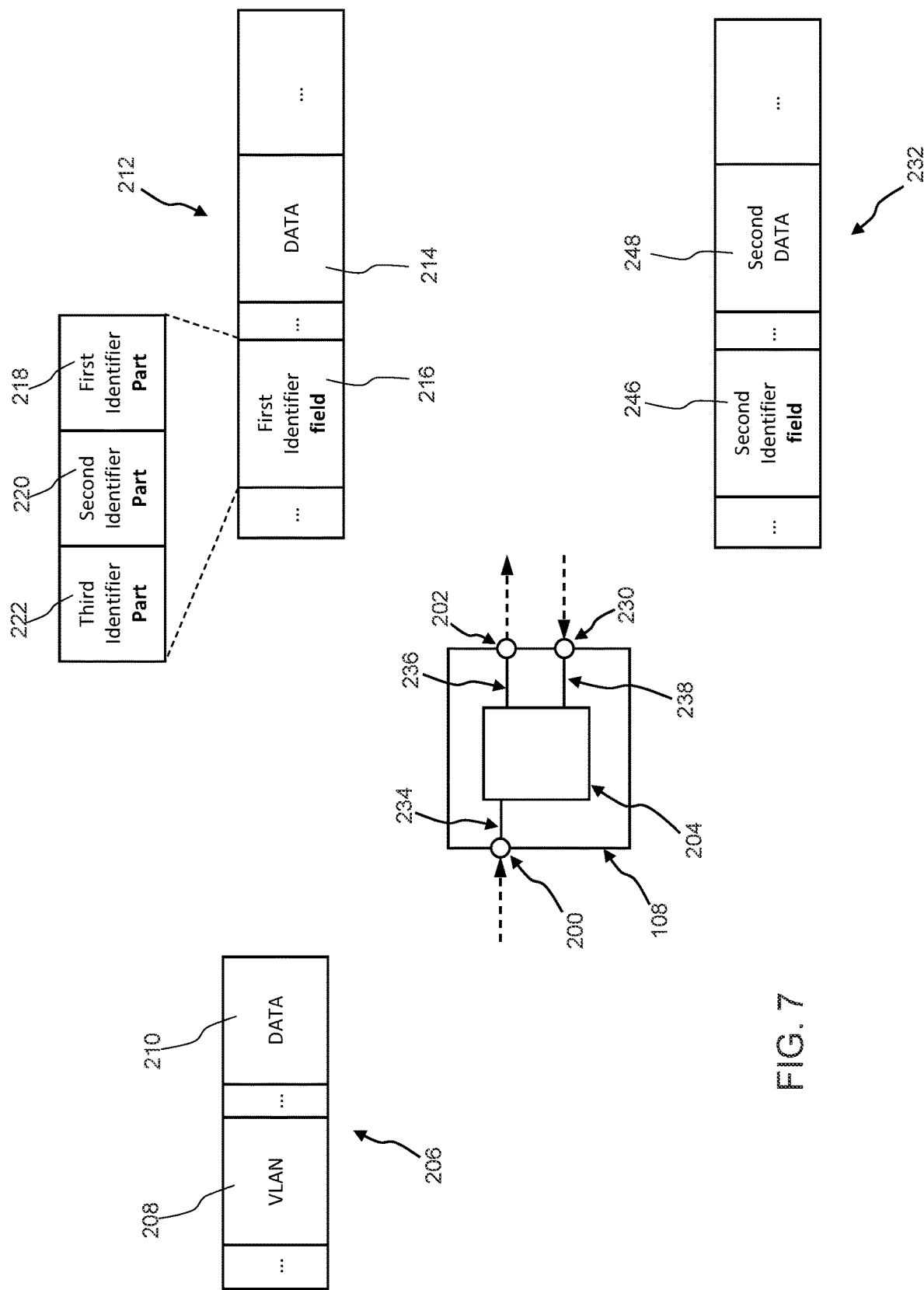
FIG. 7 shows a simplified block diagram of a CAN Controller and simplified representations of a data packet and CAN frames.

FIG. 7 is essentially the same as FIG. 3, except that the first identifier field 216 of the first CAN frame 212 in FIG. 7 is formed by three identifier parts 218, 220, 222.

The third identifier part 222 may have a higher impact on the overall priority than the second identifier part 220. In other words, the third sub-priority represented by the third identifier part 222 has the greatest influence on the overall priority of the first CAN frame 212. In particular, the third sub-priority may have a greater influence on the overall priority than the second sub-priority and the first sub-priority. The overall priority may be formed from the three sub-priorities. In particular, the overall priority can be formed from a chain of the three sub-priorities.

In an example, the bits of the third identifier part 218 form the most significant bits of the first identifier field 216 of the first CAN frame 212. In other words, the third identifier part 218 may include the most significant bits of the first identifier field 216 of the first CAN frame 212. The third identifier part 222 may therefore also form the most significant bit of the first identifier field 216 of the first CAN frame 212. Therefore, the third sub-priority represented by the third identifier part 222 has the greatest influence on the overall priority of the first CAN frame 212, as already mentioned. Nevertheless, the second sub-priority and the first sub-priority are not completely insignificant. In this context, reference is made to the already explained relationship between the second and first sub-priority in an analogous manner.

In an example, the first identifier field 216 of the first CAN frame 212 is formed by the processing unit 204 in the following order of associated identifier parts: third identifier part 222, second identifier part 220, and first identifier part 218. The first identifier part 218 preferably forms the least significant bit of the first identifier field 216. The third identifier part 222 preferably forms the most significant bit of the first identifier field 216. In an example, the first identifier field 216 may comprise a total of 11 bits. In this regard, 7 bits of the 11 bits of the first identifier field 216 may be comprised by the first identifier part 218. The remaining 4 bits of the first identifier field 216 may be comprised of the at least 1 bit of the second identifier part 220 and the at least 1 bit of the third identifier part 222.

As previously discussed, in an example, it may be provided that the second identifier part 220 represents or is formed by the priority field 208 of the data packet 206. In this example, it is further preferred that the second identifier part 220 is not formed by the queue field. Provided that the data packet 206 is an Ethernet packet 206, the second identifier part 220 may be formed by, for example, the PCP field of the VLAN tag (as an example of the priority field 208). The other parts of the VLAN tag 208 are not used to form the third identifier part 222 in an example. In this example, the bits of the PCP field may form the bits of the second identifier part 220. However, it is also possible that (the bits) of the second identifier part 220 represent the PCP field or its priority. As a result, it may be achieved that the second identifier part 220 represents a second sub-priority of the overall priority of the first CAN frame 212, where the second sub-priority may correspond to the priority represented by the PCP field.

Provided that the second identifier part 220 is represented by or formed by the packet priority field 208, it may be provided in an example that the third identifier part 222 is formed by the queue field. The queue field may represent a queue priority for the first CAN frame 212. In this context, reference is made to the preceding explanations in an analogous manner. The third sub-priority represented by the third identifier part 222 has the greatest impact on the overall priority of the first CAN frame 212, and therefore the overall priority of the first CAN frame 212 may increase with each lost arbitration. This may effectively prevent a first CAN frame 212 from not being sent completely for a long time if the first sub-priority is small.

Previously, examples were given in which the second identifier part 220 may represent or be formed by the packet priority field 208, and the third identifier part 222 may be formed by the queue field. However, the mapping of the packet priority field 208 and the queue field may also be reversed, as will be explained with examples below.

In an example, the second identifier part 220 may be formed by the queue field. Further, the third identifier part 222 may be represented by or formed by the packet priority field 208. Preferably, the second identifier part 220 is not represented by or formed by the packet priority field 208. Thus, it is possible for the third identifier part 222 alone to be represented by or formed by the priority field 208. For example, if the data packet 206 is an Ethernet packet 206, the third identifier part 222 may be formed by the PCP field of the VLAN tag (as an example of the priority field 208).

The other parts of the VLAN tag 208 are not used to form the third identifier part 222 in an example. Thus, the bits of the PCP field may directly form the bits of the third identifier part 222. However, it is also possible that the third identifier part 222 indirectly represents the PCP field or the priority thereof. As a result, it may be achieved that the third identifier part 222 represents a third sub-priority of the overall priority of the CAN frame 212, where the third sub-priority may correspond to the priority represented by the PCP field. Provided that the first identifier field 216 has three identifier parts 218, 220, 222, the third sub-priority may have the greatest impact on the overall priority of the CAN frame 212. In this context, reference is made to the preceding explanations in an analogous manner.

Although in the preceding example the third sub-priority may have the greatest impact on the overall priority of the first CAN frame 212, the second sub-priority represented by the second identifier part 220 is not entirely insignificant. The second identifier part 220 may be formed by the queue field. The queue field may comprise at least one bit. The second sub-priority represented by the queue field may also be referred to as the queue priority for the first CAN frame 212. With each lost arbitration to send the first CAN frame 212, the queue priority may increase. However, if the queue field has exactly one bit, the queue priority can increase only once. If, on the other hand, the queue field comprises several bits, the queue priority can also be increased several times (after each lost arbitration). As a second priority part, the queue priority may influence the overall priority of the first CAN frame 212. Thus, the overall priority of the first CAN frame 212 improves (increases) with each lost arbitration.

In an example, the CAN controller 108 is configured to store the first CAN frame 212. After a lost arbitration to send the first CAN frame 212, the identifier part formed by the queue field may be modified to achieve an improved (higher) priority. After that, the first CAN frame 212 can be sent again with the improved (higher) overall priority.

In an example, the second identifier part 220 and the third identifier part 222 each represent a sub-priority of the first CAN frame 212 having at least two bits and at most ten bits. For example, the second identifier part 220 may have between two bits and ten bits and may represent the second sub-priority as a part of the overall priority of the first CAN frame 212. The third identifier part 222 may have, for example, between two and ten bits and may represent the third sub-priority as a part of the overall priority of the first CAN frame 212. By changing the second identifier part 218 and/or by changing the third identifier part 222, the overall priority of the first CAN frame 212 may be increased. Increasing the overall priority of the first CAN frame 212 may be desirable if the first CAN frame 212 is based on a data packet 206 whose packet priority field 208 represents a particularly high priority. Increasing the overall priority of the first CAN frame 212 may also be desirable if the first CAN frame 212 loses in an arbitration to send the first CAN frame 212, so that when the first CAN frame 212 is resent, there is a higher chance of successfully sending the first CAN frame 212.

In an example, the CAN controller 108 includes a receive data (RXD) interface 230. The processing unit 204 may be coupled to the RXD interface 230. Preferably, a signal connection 238 extends from the processing unit 204 to the RXD interface 230. The processing unit 204 may be configured to receive, via the RXD interface 230, an RXD signal representing at least a part of a second CAN frame 232. The second CAN frame 232 may have the same structural design as the first CAN frame 212. Therefore, analogous explanations of the structural design of the first CAN frame 212 are referred to for the second CAN frame 232. The schematic illustrations of the first CAN frame 212 in FIGS. 4 and 5 and the associated explanations may therefore apply in an analogous manner to the second CAN frame 232. In FIGS. 3 and 7, the second CAN frame 232 is not reproduced in its entirety. The second CAN frame 232 has a second identifier field 246 and a second user data field 248.

If a first CAN frame 212 generated by the CAN controller 108 is transmitted to a CAN transceiver 112 and the CAN transceiver 112 generates a CAN bus signal on the CAN bus 104, the CAN bus signal fully representing the first CAN frame 212, the CAN transceiver 112 further receives this CAN bus signal via an associated receiver and, based on this received CAN bus signal, generates an RXD signal that the CAN transceiver 112 transmits to the RXD interface 230 of the CAN controller 108. Using the CAN bus signal, the first CAN frame 212 can be transmitted over the CAN bus 104 from one CAN device 102 to another CAN device 102. According to the CAN standard, the priority of a CAN frame (represented by the associated IDF-Field) is used to determine by arbitration which CAN device 102 of a CAN system 100 may send a CAN frame completely and thus successfully. Therefore, if arbitration is successful, the RXD signal represents the complete second CAN frame 232, which is a copy of the first CAN frame 212. If the arbitration is not successful, the RXD signal will only be able to represent a part of the second CAN frame 232. It is desirable after a lost arbitration that the overall priority of the first CAN frame 212 can be increased for the next send attempt.

In an example, the processing unit 204 of the CAN controller 108 is further configured to perform the following steps S4) through S7):

S4) Receiving an RXD signal 230 from the CAN controller 108, the RXD signal representing at least a part of the second CAN frame 232 caused by the transmission (attempt) of the first CAN frame 212.

S5) Detecting, based on the RXD signal, whether a complete transmission of the first CAN frame 212 was either successful or unsuccessful.

S6) If the transmission of the first CAN frame 212 was unsuccessful, modify the first identifier field 216 of the first CAN frame 212 so that the second and/or third identifier parts 220, 222 result in a higher overall priority of the first CAN frame 212.

S7) Sending the modified first CAN frame 212 via the TXD interface 202.

It should be taken into account that step S4) is preferably preceded by another step s3), namely that the processing unit 204 is configured to send the first CAN frame 212 via the TXD interface 202. This has been explained before. After the first CAN frame 212 is preferably sent to the transceiver 112 via the TXD interface 202, it can be seen, based on the previous explanations, that in step S4) an RXD signal 230 can be received from the CAN controller 108 via the associated RXD interface 230. Whether the RXD signal represents only a part of the second CAN frame 232 or the full CAN frame 232 depends on whether the arbitration to send the first CAN frame 212 was successful. The success of the arbitration in turn depends on the overall priority of the first CAN frame 212. If the arbitration to send the first CAN frame 212 was successful, the RXD signal will fully represent the second CAN frame 232. If the arbitration to send the first CAN frame 212 was not successful, the RXD signal will only partially represent the second CAN frame 232. The second CAN frame 232 is caused by the first CAN frame 212. Preferably, the second CAN frame 232 is a duplicate of the first CAN frame 212. If another CAN frame is represented by the RXD signal, which is not caused by the first CAN frame 212 and/or which is not a duplicate of the first CAN frame 212, this other CAN frame is preferably not understood as second CAN frame 232.

Preferably, the processing unit 204 is configured to compare the CAN frame represented by the RXD signal with the first CAN frame 212 in step S5). Further, the processing unit 204 may be configured to detect whether the RXD signal represents only a part of a CAN frame or whether the RXD signal represents a full CAN frame. If the RXD signal represents a complete CAN frame, the processing unit 204 may compare that CAN frame to the first CAN frame 212. If the result is that the CAN frame is identical to the first CAN frame 212, the processing unit 204 will thereby determine the CAN frame to be the second CAN frame 232. In this case, the processing unit 204 will in step S5) further detect that a complete transmission of the first CAN frame 212 was successful. However, if the processing unit 204 determines that the RXD signal represents a CAN frame that is not complete or the CAN frame represented by the RXD signal is not the second CAN frame 232, then the processing unit 204 will detect in step S5) that a complete transmission of the first CAN frame 212 was not successful.

If the sending of the first CAN frame 212 was not successful, the processing unit 204 modifies the first identifier field 216 of the first CAN frame 212, namely in the second and/or third identifier part 220, 222. Preferably, only one of the two identifier parts 220, 222 is modified by the processing unit 204 in such a way that the associated sub-priority and thus also the overall priority of the first CAN frame 212 is increased. This increases the chance that the first CAN frame 212 can be successfully transmitted over the CAN bus 104 (represented by a CAN bus signal).

In step S7), the processing unit 204 sends the (modified) first CAN frame 212 via the TXD interface 202. It should be noted that this sending refers to the transmission of the first CAN frame 212 from the CAN controller 108 to a CAN transceiver 112. The CAN transceiver 112 handles the arbitration of sending the first CAN frame 212 via a CAN bus signal. In doing so, the transmission of the first CAN frame 212 may not be successfully executed by the CAN transceiver 112 if the arbitration is not successful.

In an example, the processing unit 204 is configured to repeatedly execute the group comprising steps S4) to S7) until the successful sending of the first CAN frame 212 is detected in step S5) of the respective group. Thereupon, an abort of the repetition may occur. Step S7) of the group then no longer needs to be executed, since the first CAN frame 212 has then already been successfully sent.

When the group is first executed, the queue field may be set to a predetermined initial value by the processing unit 204. The initial value may represent the highest logical value that can be achieved with the number of bits of the queue field. The initial value may represent the lowest sub-priority.

In an example, the processing unit 204 of the CAN controller 108 is configured to incrementally increase the sub-priority represented by the second or third identifier part 220, 222 with each execution of step S6). The value of the respective identifier part 220, 222 may therefore increase by a value (increment) of one, two, three or a higher value in each step. The repetition of the group with steps S4) to S7) results in a dynamic adjustment of the overall priority of the first CAN frame 212, which also improves the chance of successfully sending the first CAN frame 212 after each execution of step S6).

In an example, the processing unit 204 of the CAN controller 108 is configured to record, in step S6), a respective time since the first transmission of the first CAN frame 212, referred to as a waiting time. When the group comprising steps S4) to S7) is executed for the first time, the first transmission of the first CAN frame 212 occurs in step S7). The processing unit 204 may start the acquisition of the waiting time by executing step S7). In an example, the processing unit 204 of the CAN controller 108 is configured to increment the sub-priority represented by the second or third identifier part 220, 222 based on the waiting time. The processing unit 204 may perform the increasing of the sub-priority in step S6). Further, the waiting time may be set to an initial value with the initial execution of the group. The initial value may be zero. If the group is executed for the first time by the processing unit 204 using steps S4) to S7), the waiting time may be zero when step S6) is executed for the first time. If the sending of the first CAN frame 212 is not successful in step S7), the processing unit 204 may start acquiring the waiting time by executing step S7). Thereupon, the group comprising steps S4) to S7) may be executed again by the processing unit 204. In step S6), the waiting time is a value greater than zero, such that the processing unit 204 increases the sub-priority represented by the second identifier part 220 or the sub-priority represented by the third identifier part 222. Preferably, of the two identifier parts 220, 222, the processing unit 204 increases the identifier part 220, 222 representing the queue priority. The increase in sub-priority may be determined proportionally to the value of the queue time by the processing unit 204.

In an example, the first identifier field 216 is provided to comprise eleven bits. The first identifier part 218 may comprise seven bits. The second identifier part 220 of the first identifier field 216 may comprise exactly one (1) bit, such that the third identifier part 222 comprises three bits. However, it is also possible that a different distribution of the total number of bits of the first identifier field 216 among the identifier parts 218, 220, 222 is provided. In another example, the first identifier part 218 may comprise four bits, the second identifier part 220 may comprise four bits, and the third identifier part 222 may comprise three bits.

With reference to FIG. 1, it has already been indicated that a CAN device 102 may include the CAN controller 108 and a CAN transceiver 112. In FIG. 2, an example of the device 102 is shown schematically. The TXD interface 202 of the CAN controller 108 may be coupled to the CAN transceiver 112 via a signal connection to transmit the first CAN frame 212 from the CAN controller 108 to the CAN transceiver 112. The transmission may be by means of a TXD signal representing the first CAN frame 212. Furthermore, the RXD signal interface of the CAN controller 108 is coupled to the CAN transceiver 112. For this purpose, another signal connection may be provided between the CAN transceiver 112 and the TXD signal interface 230 of the CAN controller 108. Via the RXD signal interface 230, the CAN controller 108 may receive the second CAN frame 232. The second CAN frame 232 can be transmitted via a TXD signal that the CAN transceiver 112 transmits to the RXD interface 230 of the CAN controller 108.

Figure 8:
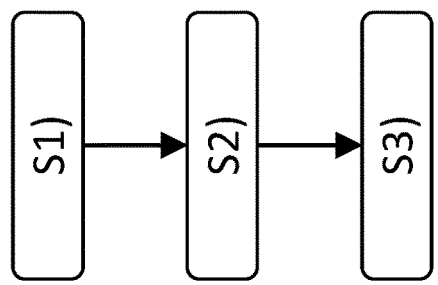

FIG. 8 schematically illustrates an example of a method. The method is for the CAN controller 108 comprising the input interface 200, the TXD interface 202, and the processing unit 204. The input interface 200 is coupled to the processing unit 204. The processing unit 204 is also coupled to the TXD interface 202. The method includes at least the following steps:

S1) Receiving the data packet 206 at the processing unit 204 via the input interface 200, wherein the data packet 206 comprises the packet priority field 208 and the packet payload field 210;

S2) Generating the first CAN frame 212 based on the data packet 206 by means of the processing unit 204, such that the first payload field 214 of the first CAN frame 212 represents at least the packet payload field 210 and the first identifier field 216 of the first CAN frame 212 comprises the first identifier part 218 and the second identifier part 220, wherein the first identifier part 218 represents predefined data for identifying the CAN controller 108, and wherein the second identifier part 220 represents the packet priority field 208 and/or comprises a queue field representing a queue priority for the first CAN frame 212; and S3) Sending the first CAN frame 212 via the TXD interface 202.

Figure 9:
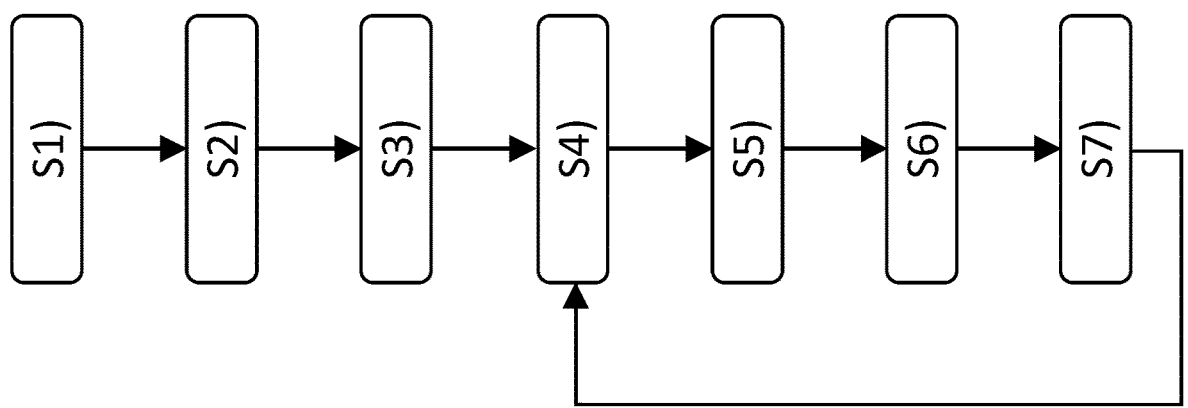
FIGS. 8 and 9 show simplified flow charts of a method.

FIG. 9 shows an example of the method. In this example of the method, the CAN controller 108 includes the RXD interface 230. The processing unit 204 is coupled to the RXD interface 230. In this example, the method further comprises the following steps:

S4) Receiving, via the RXD interface 230, an RXD signal representing at least a part of a second CAN frame 232 caused by the transmission of the first CAN frame 212;

S5) Detect based on the RXD signal whether a complete transmission of the first CAN frame 212 was either successful or unsuccessful;

S6) if transmission of the first CAN frame 212 was unsuccessful, modifying the first identifier field 216 of the first CAN frame 212 so that the second or third identifier part 220, 222 represents a higher sub-priority; and S7) Transmitting the modified first CAN frame 212 via the TXD interface 202.

In another example, the method may provide that the group comprising steps S4) to S7) are repeatedly executed by the processing unit 204 until successful transmission of the first CAN frame 212 is detected in step S5).

Although the described exemplary embodiments disclosed herein focus on devices, systems, and methods for using same, the present disclosure is not necessarily limited to the example embodiments illustrate herein. For example, various embodiments of providing The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A Controller Area Network, CAN, controller, comprising:
   an input interface,
   a transmit data, TXD, interface, and
   a processing unit,
   wherein the input interface is coupled to the processing unit,
   wherein the processing unit is configured to receive via the input interface a data packet comprising a packet priority field, a packet payload field,
   wherein the processing unit is configured to generate a first CAN frame based on the data packet, such that
   a first payload field of the first CAN frame represents at least the packet payload field and
   a first identifier field of the first CAN frame comprises a first identifier part and a second identifier part,
   wherein the first identifier part represents predefined data for identifying the CAN controller, and
   wherein the second identifier part represents the packet priority field and/or comprises a queue field representing a queue priority for the first CAN frame,
   wherein the processing unit is coupled to the TXD interface,
   wherein the processing unit is configured to send the first CAN frame via the TXD interface, and
   wherein the first identifier part forms the least significant bit of the first identifier field of the first CAN frame.

2. The CAN controller of claim 1, wherein the processing unit is configured to generate the first CAN frame based on the data packet such that the first identifier field of the first CAN frame is formed by the first identifier part, the second identifier part and a further, third identifier part.

3. The CAN controller of claim 2, wherein the first identifier field of the first CAN frame is formed in the following order of associated parts: the third identifier part, the second identifier part, and the first identifier part.

4. The CAN controller of claim 1, wherein the processing unit is configured to generate the first CAN frame based on the data packet such that the first identifier field of the first CAN frame is formed by the first identifier part, the second identifier part and a further, third identifier part.

5. The CAN controller of claim 4, wherein the third identifier part forms the most significant bit of the first identifier field of the first CAN frame.

6. The CAN controller of claim 5, wherein the first identifier field of the first CAN frame is formed in the following order of associated parts: third identifier part, second identifier part, and first identifier part.

7. The CAN controller of claim 6, wherein the second identifier part is formed by the queue field, and wherein the third identifier part represents or is formed by the packet priority field.

8. The CAN controller of claim 7, wherein the second identifier part represents or is formed by the packet priority field, and wherein the third identifier part is formed by the queue field.

9. The CAN controller of claim 8, wherein the CAN controller is configured to store the first CAN frame.

10. The CAN controller of claim 8, wherein each of the second and third identifier part represents a sub-priority of the first CAN frame by at least two bit and at most ten bits.

11. The CAN controller of claim 10, wherein the CAN controller comprises a receive-data, RXD, interface, wherein the processing unit is coupled to the RXD interface, and wherein the processing unit is configured to perform the following steps:
  S4) receiving via the RXD interface an RXD signal representing at least a part of a second CAN frame caused by sending the first CAN frame,
  S5) detecting based on the RXD signal whether a complete sending of the first CAN frame was either successful or unsuccessful,
  S6) if the sending of the first CAN frame was unsuccessful, modifying the first identifier field of the first CAN frame to produce a modified first CAN frame such that the second and/or third identifier part causes a higher priority of the modified first CAN frame, and
  S7) sending the modified first CAN frame via the TXD interface.

12. The CAN controller of claim 3, wherein the CAN controller comprises a receive-data, RXD, interface, wherein the processing unit is coupled to the RXD interface, and wherein the processing unit is configured to perform the following steps:
  S4) receiving via the RXD interface an RXD signal representing at least a part of a second CAN frame caused by sending the first CAN frame,
  S5) detecting based on the RXD signal whether a complete sending of the first CAN frame was either successful or unsuccessful,
  S6) if the sending of the first CAN frame was unsuccessful, modifying the first identifier field of the first CAN frame to produce a modified first CAN frame such that the second and/or third identifier part causes a higher priority of the modified first CAN frame, and
  S7) sending the modified first CAN frame via the TXD interface.

13. The CAN controller of claim 12, wherein the processing unit is configured to repeatedly perform the group comprising steps S4) to S7) until the successful sending of the first CAN frame is detected in step S5).

14. The CAN controller of claim 13, wherein the processing unit is configured to incrementally increase the sub-priority represented by the second or third identifier part with each performing of step S6).

15. The CAN controller of claim 14, wherein the processing unit is configured to detect in step S6) a respective time since a first unsuccessful attempt to send the first CAN frame, referred to as a waiting time, and to increase the sub-priority represented by the second or third identifier part based on the waiting time.

16. A CAN device comprising a CAN controller of claim 1 and a CAN transceiver.

17. A method for a CAN controller comprising an input interface, a transmit data, TXD, interface, a receive-data, RXD, interface, and a processing unit, wherein the input interface is coupled to the processing unit, wherein the processing unit is coupled to the TXD interface, wherein the processing unit is coupled to the RXD interface, and wherein the method comprising the steps of:
  S1) Receiving a data packet at the processing unit via the input interface, the data packet comprising a packet priority field, a packet payload field;
  S2) Generating a first CAN frame based on the data packet at the processing unit, such that a first payload field of the first CAN frame represents at least the packet payload field and a first identifier field of the first CAN frame comprises a first identifier part and a second identifier part, wherein the first identifier part represents predefined data for identifying the CAN controller, and wherein the second identifier part represents the packet priority field and/or comprises a queue field representing a queue priority for the first CAN frame;
  S3) Sending the first CAN frame via the TXD interface;
  S4) receiving via the RXD interface an RXD signal representing at least a part of a second CAN frame caused by sending the first CAN frame,
  S5) the processing unit detecting based on the RXD signal whether a complete sending of the first CAN frame was either successful or unsuccessful,
  S6) if the sending of the first CAN frame was unsuccessful, the processing unit modifying the first identifier field of the first CAN frame to produce a modified first CAN frame such that the second and/or third identifier part causes a higher priority of the modified first CAN frame, and
  S7) sending the modified first CAN frame via the TXD interface.

18. The method of claim 17, wherein the processing unit is configured to repeatedly perform the group comprising steps S4) to S7) until the successful sending of the first CAN frame is detected in step S5).

* * * * *